United States Patent
Ishikawa et al.

(10) Patent No.: US 9,583,789 B2
(45) Date of Patent: Feb. 28, 2017

(54) NON-AQUEOUS ELECTROLYTE SECONDARY BATTERY

(71) Applicant: NEC Corporation, Tokyo (JP)

(72) Inventors: Hitoshi Ishikawa, Tokyo (JP); Akinobu Nakamura, Tokyo (JP); Koji Utsugi, Tokyo (JP)

(73) Assignee: NEC Corporation, Tokyo (JP)

(*) Notice: Subject to any disclaimer, the term of this patent is extended or adjusted under 35 U.S.C. 154(b) by 28 days.

(21) Appl. No.: 14/411,071

(22) PCT Filed: Jun. 26, 2013

(86) PCT No.: PCT/JP2013/067573
§ 371 (c)(1),
(2) Date: Dec. 23, 2014

(87) PCT Pub. No.: WO2014/003077
PCT Pub. Date: Jan. 3, 2014

(65) Prior Publication Data
US 2015/0155597 A1    Jun. 4, 2015

(30) Foreign Application Priority Data

Jun. 28, 2012  (JP) ................................ 2012-145774

(51) Int. Cl.
*H01M 10/0567* (2010.01)
*H01M 10/052* (2010.01)
*H01M 10/0569* (2010.01)

(52) U.S. Cl.
CPC ..... *H01M 10/0567* (2013.01); *H01M 10/052* (2013.01); *H01M 10/0569* (2013.01); *H01M 2300/0025* (2013.01); *Y02E 60/122* (2013.01); *Y02P 70/54* (2015.11); *Y02T 10/7011* (2013.01)

(58) Field of Classification Search
CPC ......... H01M 10/0567; H01M 10/0569; H01M 10/052; H01M 2300/0025; Y02E 60/122
See application file for complete search history.

(56) References Cited

U.S. PATENT DOCUMENTS

2008/0311472 A1    12/2008    Yamaguchi et al.

FOREIGN PATENT DOCUMENTS

| JP | 63-102173 | 5/1988 |
|----|-----------|--------|
| JP | 11-339850 | 12/1999 |
| JP | 2000-003724 | 1/2000 |
| JP | 2004-281368 | 10/2004 |
| JP | 2008-153118 A | 7/2008 |
| JP | 2009-021229 | 1/2009 |
| JP | 2009-187940 | 8/2009 |
| JP | 2009-193696 | 8/2009 |
| JP | 2011-124123 | 6/2011 |
| JP | 2012-043627 | 3/2012 |
| JP | 2012-094454 | 5/2012 |

OTHER PUBLICATIONS

Korean Notice of Grounds for Rejection issued in corresponding Korean Patent Application No. 2015-7002145, dated Feb. 17, 2016, 14 pages.
International Search Report corresponding to PCT/JP2013/067573, mail date Sep. 17, 2013, 2 pages.

*Primary Examiner* — Laura Weiner
(74) *Attorney, Agent, or Firm* — Wilmer Cutler Pickering Hale and Dorr LLP

(57) ABSTRACT

The present invention relates to a non-aqueous electrolyte comprising a non-aqueous electrolyte solvent, a supporting salt, and a sulfonate represented by a predetermined formula, the non-aqueous electrolyte having a sulfonate concentration of 0.001 wt % or more and less than 0.2 wt % based on the total mass of the non-aqueous electrolyte.

9 Claims, 1 Drawing Sheet

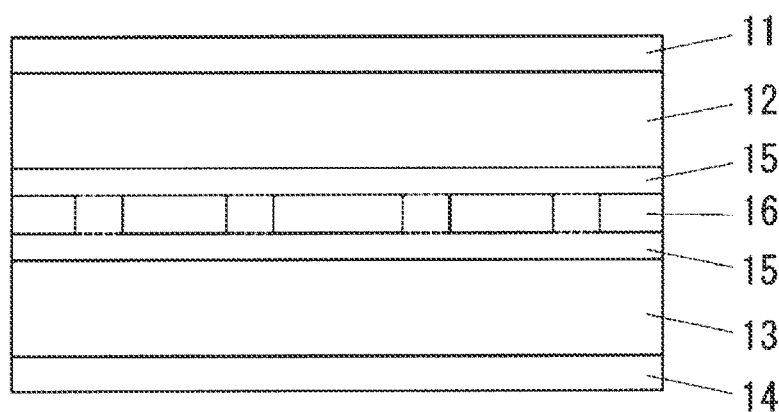

NON-AQUEOUS ELECTROLYTE SECONDARY BATTERY

CROSS-REFERENCE TO RELATED APPLICATIONS

This application is a national stage application of International Application No. PCT/JP2013/067573 entitled "NON-AQUEOUS ELECTROLYTE SECONDARY BATTERY" filed on Jun. 26, 2013, which claims priority to Japanese Patent Application No. 2012-145774 filed on Jun. 28, 2012, the disclosure of which is hereby incorporated by reference in their entirety.

TECHNICAL FIELD

The present invention relates to a non-aqueous electrolyte secondary battery excellent in stability.

BACKGROUND ART

The uses of a lithium ion secondary battery among secondary batteries have been spreading not only as a power source for consumer products such as notebook computers and mobile devices including a cellular phone but also, in recent years, as a power source for driving machines such as an electric vehicle, an electric motor cycle, and a power-assisted bicycle, a power source for small electrically driven machine, and a power source for a power storage system making use of its characteristics such as small and light weight and high energy density.

As a substance capable of desorbing and inserting a lithium ion, a lithium based complex oxide of a transition metal, a carbon material, lithium metal, an alloy based compound, and an oxide carbon material are generally used for a material for positive and negative electrode active materials of a lithium ion secondary battery. Moreover, a carbonate based solvent and a lithium salt as a supporting salt are generally used as a non-aqueous electrolyte.

In a charging and discharging process of the secondary battery, a desorption and insertion reaction of a lithium ion occurs at an interface of an electrode and an electrolyte. However, besides the reaction, an electrolyte solvent or the supporting salt causes a decomposition reaction to form a coating film having a high resistance on the surface of the electrode, which inhibits the desorption and insertion reaction of the lithium ion that primarily should occur. As a result thereof, irreversible lowering of discharging capacity or the like is accelerated, which leads to deterioration of the battery. Therefore, various ideas have been devised to suppress the deterioration.

As one of the ideas, a method for suppressing the decomposition reaction by forming a protective film on the surface of the electrode is included, and the means thereof proposes adding an additive having coating film-forming capability to the electrolyte. Patent Literatures 1 to 3, for example, discloses that when a cyclic monosulfonic acid ester is used as an additive, a coating film is formed on the surface of the electrode to improve battery properties. A proposal to use a cyclic disulfonic acid ester has also been made recently as shown by Patent Literature 4 because the cycle properties and the storage properties (suppression of an increase in resistance and the suppression of lowering in a capacity holding ratio) can be more improved than those for the secondary battery using the cyclic monosulfonic acid ester.

As described herein, a sulfonic acid ester-based compound is useful as an electrolyte additive having a coating film-forming capability.

CITATION LIST

Patent Literature

Patent Literature 1: Japanese Patent Laid-Open No. 63-102173
Patent Literature 2: Japanese Patent Laid-Open No. 2000-3724
Patent Literature 3: Japanese Patent Laid-Open No. 11-339850
Patent Literature 4: Japanese Patent Laid-Open No. 2004-281368

SUMMARY OF INVENTION

Technical Problem

However, when the non-aqueous electrolyte containing the sulfonic acid ester-based additive is used for production of the secondary battery after the non-aqueous electrolyte is left standing under, for example, a high temperature, there has been a problem that the lowering of the battery capacity or the deterioration of storage and cycle properties for the secondary battery occurs.

Solution to Problem

The present invention relates to a non-aqueous electrolyte comprising a non-aqueous electrolyte solvent, a supporting salt, and a sulfonate represented by the following general formula (1):

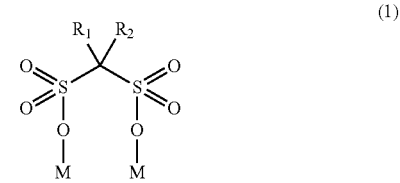

wherein $R_1$ and $R_2$ each independently represent a hydrogen atom, a halogen atom, or C1 to C5 alkyl group, alkenyl group or alkoxy group, and M represents an alkali metal or an alkaline earth metal, wherein the concentration of the sulfonate is 0.001 wt % or more and less than 0.2 wt % based on the total mass of the non-aqueous electrolyte.

Advantageous Effects of Invention

According to the present invention, the charging and discharging efficiency, the cycle properties, and so on of a non-aqueous electrolyte secondary battery can be improved.

BRIEF DESCRIPTION OF DRAWING

FIG. 1 is a schematic drawing of a non-aqueous electrolyte secondary battery of the present invention.

DESCRIPTION OF EMBODIMENTS

According to the present embodiment, the battery life in a cycle test or a storage evaluation test can be improved particularly in a non-aqueous electrolyte secondary battery using a non-aqueous electrolyte containing a sulfonic acid ester-based compound.

Hereinafter, the constitution of the non-aqueous electrolyte and the non-aqueous electrolyte secondary battery using the non-aqueous electrolyte of the present invention will be described.

Non-Aqueous Electrolyte

In the present embodiment, the non-aqueous electrolyte comprises a non-aqueous electrolyte solvent, a supporting salt, and a sulfonate represented by the following formula (1), and the concentration of the sulfonate represented by the following formula (1) is 0.001 wt % or more and less than 0.2 wt % based on the total mass of the non-aqueous electrolyte. In addition, the sulfonate represented by the following formula (1) is hereinafter sometimes described simply as the "sulfonate".

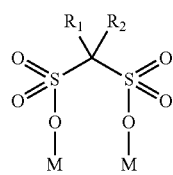

(1)

In the formula (1), $R_1$ and $R_2$ each independently represent a hydrogen atom, a halogen atom, or C1 to C5 alkyl group, alkenyl group, or alkoxy group, and M represents an alkali metal or an alkaline earth metal, preferably lithium.

In the formula (1), it is preferable that $R_1$ and $R_2$ are each independently a hydrogen atom, C1 to C5 alkyl group, or alkoxy group, more preferably a hydrogen atom, methyl group, ethyl group, methoxy group, or ethoxy group, further more preferably a hydrogen atom, methyl group, or ethyl group.

Examples of the compound represented by the general formula (1) include dilithium methanedisulfonate, dilithium 1,1-ethanedisulfonate, dilithium 1-methyl-1,1-ethanedisulfonate, dilithium 1,1-propanedisulfonate, dilithium 2-methyl-1,1-propanedisulfonate, dilithium 1,1-butanedisulfonate, dilithium methoxymethanedisulfonate, dilithium ethoxymethanedisulfonate, dilithium 1,1-prop-2-yldisulfonate; but the present invention is not limited to these. Moreover, the non-aqueous electrolyte of the present embodiment may contain the compound represented by the general formula (1) alone or in combinations of two or more.

The non-aqueous electrolyte of the present embodiment contains the sulfonate represented by the formula (1) in an amount of 0.001 wt % or more and less than 0.2 wt % based on the total mass of the non-aqueous electrolyte, preferably 0.001 wt % or more and 0.15 wt % or less. The inventors of the present invention have made diligent studies and, as a result thereof, have found that when the sulfonate concentration in the non-aqueous electrolyte is made within the above-described range, the lowering of the capacity of the non-aqueous electrolyte secondary battery manufactured using the non-aqueous electrolyte is small and the battery properties are favorable. When the concentration of the sulfonate represented by the formula (1) is 0.2 wt % or more based on the total mass of the non-aqueous electrolyte, the deterioration of the electrolyte becomes remarkable, and when a secondary battery is manufactured using the non-aqueous electrolyte having a sulfonate concentration of 0.2 wt % or more based on the total mass of the electrolyte, the battery properties become worse in such a way that the capacity retention ratio in the cycle property evaluation is lowered.

It is preferable that the non-aqueous electrolyte of the present invention contains a disulfonic acid ester compound such as a chain disulfonic acid ester compound and a cyclic disulfonic acid ester compound. A coating film is formed on the surface of the electrode to improve battery properties by the electrolyte containing the disulfonic acid ester compound.

Specific examples of the disulfonic acid ester compound include, but not limited to these in the present invention, dimethyl methanedisulfonate, diethyl methanedisulfonate, bis(trifluoromethyl) methanedisulfonate, bis(trimethylsilyl) methanedisulfonate, ethylene ethylenedisulfonate, ethylene methanedisulfonate, methylene methanedisulfonate, propylene methanedisulfonate, ethylene 1,1-ethanedisulfonate, and dimethyl 1,1-ethanedisulfonate. The electrolyte of the present embodiment may contain the disulfonic acid ester compound alone or in combinations of two or more.

The concentration of the disulfonic acid ester compound in the non-aqueous electrolyte is not particularly limited, however it is preferably 0.2 wt % or more and less than 10 wt %, more preferably 0.2 wt % or more and 5 wt % or less, further more preferably 0.2 wt % or more and 3 wt % or less.

It is considered that the sulfonate represented by the formula (1) is generated due to the occurrence of the decomposition of the disulfonic acid ester compound caused by the reaction of the decomposition product or the like of the supporting salt with the disulfonic acid ester compound in the non-aqueous electrolyte containing the disulfonic acid ester compound. On this occasion, it is anticipated that a free acid is generated, and it is considered that the free acid becomes a cause of the lowering of the battery capacity and the deterioration of storage and cycle properties.

The sulfonate represented by the formula (1) becomes liable to be generated in the case where, for example, the non-aqueous electrolyte containing the disulfonic acid ester compound is stored at a high temperature for a long period of time (3 months or more at 35° C., for example) or water is mixed into the non-aqueous electrolyte. Accordingly, it is preferable that the non-aqueous electrolyte is stored at a low temperature (room temperature or less, for example, preferably 10° C. or less) or the water content in the non-aqueous electrolyte is made 20 ppm or less for the purpose of making the concentration of the sulfonate in the non-aqueous electrolyte within the above-described range.

Examples of the supporting salt include compounds such as $LiPF_6$, $LiBF_4$, $LiAsF_6$, $LiSbF_6$, $LiClO_4$, $LiAlCl_4$, $LiN(C_kF_{2k+1}SO_2)_2$, and $LiN(C_nF_{2n+1}SO_2)(C_mF_{2m+1}SO_2)$ (k, n, and m each independently represent a natural number), or a mixture thereof. It is preferable that the concentration of the supporting salt in the non-aqueous electrolyte is 0.5 to 2.0 mol/L. It becomes easy to adjust the density, the viscosity, the conductivity, and so on in an appropriate range by making the concentration of the supporting salt within the above-described range.

In the present embodiment, examples of the non-aqueous electrolyte solvent of the non-aqueous electrolyte include, but not particularly limited to, cyclic carbonate compounds, chain carbonate compounds, chain carboxylic acid ester compounds, cyclic carboxylic acid ester compounds, cyclic ether compounds, chain ether compounds, phosphoric acid ester compounds, and fluorinated derivatives thereof. And, among these compounds, it is preferable that the non-aqueous electrolyte solvent of the non-aqueous electrolyte contains a cyclic carbonate compound and more preferably contains 10 to 60% of the cyclic carbonate compound based on 100% (volume ratio) of the non-aqueous electrolyte solvent. The non-aqueous electrolyte solvent may be used alone or in combinations of two or more.

Examples of the cyclic carbonate compound include ethylene carbonate (EC), propylene carbonate (PC), butylene carbonate (BC), vinylene carbonate (VC), and, among these compounds, ethylene carbonate (EC) and propylene carbonate (PC) are more preferable.

Examples of the chain carbonate compound include dimethyl carbonate (DMC), diethyl carbonate (DEC), and methyl ethyl carbonate (MEC).

Examples of the chain carboxylic acid ester compound include ethyl acetate, methyl propionate, ethyl formate, ethyl propionate, methyl butyrate, ethyl butyrate, methyl acetate, and methyl formate. Examples of the cyclic carboxylic acid ester compound include γ-butyrolactone. Examples of the cyclic ether compound include tetrahydrofuran and 2-methyltetrahydrofuran. Examples of the chain ether compound include 1,2-ethoxy ethane (DEE) and ethoxy methoxy ethane (EME). Examples of the phosphoric acid ester compound include trimethyl phosphate, triethyl phosphate, and tributyl phosphate.

The non-aqueous electrolyte of the present embodiment may contain a monosulfonic acid ester compound such as 1,3-propane sultone, 1,4-butane sultone, methyl methanesulfonate, methyl ethanesulfonate, methyl trifluoromethanesulfonate.

Hereinafter, the constitution of the non-aqueous electrolyte secondary battery of the present invention will be described with reference to the drawing. FIG. 1 is an example of a schematic drawing of a non-aqueous electrolyte secondary battery of the present invention.

The battery relating to the present invention has a structure shown in FIG. 1, for example. The battery has a layered structure in which a porous separator 16 is present between a positive electrode and a negative electrode. The positive electrode is manufactured by forming a layer 12 containing a positive electrode active material as a film on a surface of a positive electrode collector 11. The negative electrode is manufactured by forming a layer 13 containing a negative electrode active material as a film on a surface of a negative electrode collector 14.

Examples of the positive electrode active material used for the layer 12 containing a positive electrode active material include lithium-containing complex oxides such as $LiCoO_2$, $LiNiO_2$, and $LiMn_2O_4$ which are compounds capable of desorbing and inserting a lithium ion. Moreover, compounds in which the portion of the transition metal in these lithium-containing complex oxides is replaced with another element may be used.

Moreover, a lithium-containing complex oxide having a plateau at 4.5 V or more in terms of electric potential vs. lithium metal can also be used as a positive electrode active material. Examples of the lithium-containing complex oxide include spinel type lithium manganese complex oxides, olivine type lithium complex oxides, and inverse spinel type lithium-containing complex oxides. The lithium-containing complex oxide may be, for example, a compound represented by $Li_a(M_xMn_{2-x})O_4$ (where $0<x<2$ and $0<a<1.2$; and M is at least one selected from the group consisting of Ni, Co, Fe, Cr, and Cu.).

The positive electrode can be obtained by dispersing and kneading the above-described active material with a conductive substance such as carbon black and a binder such as polyvinylidene fluoride (PVDF) in a solvent such as N-methyl-2-pyrrolidone (NMP) and applying the resultant mixture on a collector substrate such as aluminum foil and conducting drying.

As a negative electrode active material used for the layer 13 containing a negative electrode active material, a lithium metal, lithium alloy, a carbon material, a metal oxide, or the like which is a compound capable of desorbing and inserting, or absorbing and desorbing a lithium ion can be used.

The lithium alloy is constituted by lithium and a metal capable of forming alloy with lithium. For example, the lithium alloy is constituted by binary or ternary or higher alloy of a metal such as Al, Si, Pb, Sn, In, Bi, Ag, Ba, Ca, Hg, Pd, Pt, Te, Zn, and La and lithium. As a lithium metal or lithium alloy, those having amorphous state are particularly preferable. This is because the deterioration attributable to unevenness such as a crystal grain boundary and a defect is hard to occur due to the amorphous structure.

The lithium metal or the lithium alloy can be formed by an appropriate method such as a melt cooling process, a liquid rapid cooling process, an atomizing process, a vacuum deposition process, a sputtering process, a plasma CVD process, a photo CVD process, a thermal CVD process, and a sol-gel process.

As a carbon material, graphite, amorphous carbon, diamond-like carbon, carbon nano tube, and so on which absorb lithium can be used. Among these materials, it is preferable that the carbon material is a graphite material or amorphous carbon. The graphite material is particularly advantageous for improving negative electrode performance and therefore preferred because it has a high electron conductivity, it is excellent in adhesiveness with a collector consisting of a metal such as copper, it has voltage flatness during discharging, and it contains less impurities because formed at a high processing temperature.

As a metal oxide, any one of silicon oxide, tin oxide, indium oxide, zinc oxide, lithium oxide, phosphoric acid, and boric acid, or a complex thereof may be used. It is particularly preferable that the metal oxide contains silicon oxide or tin oxide. It is preferable that the structure of the metal oxide is amorphous state. The reason for this is because the silicon oxide is stable and does not cause a reaction with another compound, and also because the amorphous structure does not lead to deterioration attributable to unevenness such as the crystal grain boundary or a defect. As a method for forming a film of the active material layer, a vapor deposition method, a CVD method, a spattering method, or the like can be used.

The negative electrode can be obtained by dispersing and kneading the above-described negative electrode active material with a binder such as polyvinylidene fluoride (PVDF) in a solvent such as N-methyl-2-pyrrolidone (NMP) and applying the resultant mixture on a collector substrate such as copper foil and conducting drying.

Moreover, besides the above-described-methods, film-forming can be conducted by a method using water as a solvent. For example, the electrode can be obtained by dispersing and kneading a material for negative electrode active material, a binder such as a styrene-butadiene based polymeric rubber material (SBR), and a thickener such as carboxymethyl cellulose (CMC) in water and applying the resultant mixture on a substrate and conducting drying to form a film.

The secondary battery of the present invention is manufactured by laminating the positive electrode and the negative electrode each manufactured by the above-described methods with the porous separator therebetween, or winding up the laminate, then attaching electrode tabs for external leads, thereafter housing the laminate in a can or a laminate resin outer package, injecting a non-aqueous electrolyte therein to immerse the laminate, then sealing the outer package, and conducting charging.

As a porous separator, porous films formed of, for example, polyolefins including polypropylene and polyethylene or a fluororesin, and a cellulose based resin etc. are used; and a ceramic separator having a layer formed of insulating metal oxides such as alumina formed on these is also used.

Examples of the shape of the non-aqueous electrolyte secondary battery relating to the present embodiment include, but not particularly limited to, a cylindrical type, a square type, a laminate outer package type, and a coin type.

EXAMPLES

Hereinafter, the present invention will be described specifically by Examples, however the present invention is not limited to the Examples.

Example 1

Manufacturing of Battery 1

Manufacturing of a battery of the present Example is described. On aluminum foil being a positive electrode collector and having a thickness of 20 μm, slurry prepared by mixing $LiMn_2O_4$ as a positive electrode active material, PVDF as a binder, and carbon black in a NMP solvent was applied and dried to manufacture a positive electrode. On copper foil being a negative electrode collector and having a thickness of 10 μm, slurry prepared by mixing graphite as a negative electrode active material and PVDF as a binder in a NMP solvent was applied and dried to manufacture a negative electrode. The manufactured positive and negative electrodes and a separator formed of polyethylene were cut in an appropriate size and were laminated in an appropriate order to manufacture a laminate. Next, tabs for electrode leads were connected to the respective layers of the positive electrode and the negative electrode in the laminate. This laminate was held between laminate resins for an outer package so that the laminate was wrapped up, then three sides of the laminate resins for the outer package were thermally fused, and thereby the laminate resins for the outer package were formed to be bag-shaped.

Preparation of Electrolyte

An electrolyte containing a mixed solvent of ethylene carbonate (EC) and diethyl carbonate (DEC) (volume ratio: 30/70) as an electrolyte solvent and $LiPF_6$ as a supporting electrolyte so that the $LiPF_6$ concentration was 1 mol/L was formulated, and dimethyl methanedisulfonate was added thereto as an additive in an amount of 2 wt % based on the total mass of the electrolyte to prepare an electrolyte. The dilithium methanedisulfonate content in the electrolyte immediately after preparing the electrolyte was calculated out from the peak intensity around 4 to 5 ppm by $^1$H-NMR analysis in deuterated methanol and was 0.005 wt % as a result thereof.

Manufacturing of Battery 2

Next, a secondary battery was manufactured by sealing the open part after the injection of the electrolyte and immersion process.

The ratio of the value for first time discharging capacity to the value for first time charging capacity was determined to be the charging and discharging efficiency. In addition, the initial charging and discharging efficiency was measured under the condition that the end-of-charge voltage was 4.2 V, the end-of-discharge voltage was 3.0 V, and the discharging current rate was 0.2 C. In a cycle evaluation test in which charging and discharging was repeated at a current value of 1 C in a thermostatic chamber at a temperature of 45° C., a value obtained by dividing the discharging capacity after 500 cycles by the initial discharging capacity was determined to be the cycle capacity holding ratio. The results are shown in Table 1.

Example 2

A secondary battery was manufactured in the same manner as in Example 1 except that the prepared electrolyte was stored at 35° C. for 1 month. The dilithium methanedisulfonate content in this electrolyte was 0.05 wt %.

Example 3

A secondary battery was manufactured in the same manner as in Example 1 except that the prepared electrolyte was stored at 35° C. for 2 months. The dilithium methanedisulfonate content in this electrolyte was 0.1 wt %.

Example 4

A secondary battery was manufactured in the same manner as in Example 1 except that ethylene methanedisulfonate was used as an additive. The dilithium methanedisulfonate content in this electrolyte was 0.004 wt %.

Example 5

A secondary battery was manufactured in the same manner as in Example 1 except that the electrolyte prepared in Example 4 was stored at 35° C. for 2 months. The dilithium methanedisulfonate content in this electrolyte was 0.08 wt %.

Example 6

A secondary battery was manufactured in the same manner as in Example 1 except that dimethyl 1,1-ethanedisulfonate was used as an additive. The dilithium 1,1-ethanedisulfonate content in this electrolyte was 0.003 wt %.

Example 7

A secondary battery was manufactured in the same manner as in Example 1 except that the electrolyte prepared in Example 6 was stored at 35° C. for 2 months. The dilithium 1,1-ethanedisulfonate content in this electrolyte was 0.06 wt %.

Example 8

A secondary battery was manufactured in the same manner as in Example 1 except that methylene methanedisulfonate was used as an additive. The dilithium methanedisulfonate content in this electrolyte was 0.006 wt %.

Example 9

A secondary battery was manufactured in the same manner as in Example 1 except that the electrolyte prepared in Example 8 was stored at 35° C. for 2 months. The dilithium methanedisulfonate content in this electrolyte was 0.11 wt %.

Comparative Example 1

A secondary battery was manufactured in the same manner as in Example 1 except that the electrolyte prepared in Example 1 was stored at 35° C. for 3 months. The dilithium methanedisulfonate content in this electrolyte was 0.2 wt %.

Comparative Example 2

A secondary battery was manufactured in the same manner as in Example 1 except that the electrolyte prepared in Example 4 was stored at 35° C. for 5 months. The dilithium methanedisulfonate content in this electrolyte was 0.27 wt %.

Comparative Example 3

A secondary battery was manufactured in the same manner as in Example 1 except that the electrolyte prepared in Example 6 was stored at 35° C. for 5 months. The dilithium 1,1-ethanedisulfonate content in this electrolyte was 0.28 wt %.

Comparative Example 4

A secondary battery was manufactured in the same manner as in Example 1 except that the electrolyte prepared in Example 8 was stored at 35° C. for 3 months. The dilithium methanedisulfonate content in this electrolyte was 0.25 wt %.

The results of the charging and discharging efficiency and the capacity holding ratio after cycles conducted in the above-described Examples and Comparative Examples are shown in Table 1.

TABLE 1

|  | Lithium sulfonate concentration in electrolyte (wt %) | Initial charging and discharging efficiency (%) | Capacity holding ratio (%) after 500 cycles at 45° C. |
|---|---|---|---|
| Ex. 1 | 0.005 | 89.8 | 88.3 |
| Ex. 2 | 0.05 | 89.6 | 88.2 |
| Ex. 3 | 0.1 | 89.3 | 88.0 |
| Ex. 4 | 0.004 | 89.7 | 88.1 |
| Ex. 5 | 0.08 | 89.5 | 88.0 |
| Ex. 6 | 0.003 | 89.8 | 88.4 |
| Ex. 7 | 0.06 | 89.5 | 88.0 |
| Ex. 8 | 0.006 | 89.7 | 88.3 |
| Ex. 9 | 0.11 | 89.3 | 88.0 |
| Comp-Ex. 1 | 0.2 | 87.1 | 83.5 |
| Comp-Ex. 2 | 0.27 | 87.0 | 83.0 |
| Comp-Ex. 3 | 0.28 | 86.8 | 82.5 |
| Comp-Ex. 4 | 0.25 | 87.0 | 83.2 |

Ex. = Example
Comp-Ex. = Comparative Example

As shown in Table 1, in the case where the lithium sulfonate concentration in the electrolyte was less than 0.2 wt % (Examples 1 to 9), the initial charging and discharging efficiency was more favorable, the lowering of the cycle capacity holding ratio was smaller, and therefore the battery properties were more favorable as compared in the case where the concentration was 0.2 wt % or more (Comparative Examples 1 to 4).

INDUSTRIAL APPLICABILITY

Examples of utilization of the present invention include driving machines such as an electric vehicle, a hybrid vehicle, an electric motor cycle, and a power-assisted bicycle, tools such as an electric tool, electronic equipment such as portable terminals and notebook computers, and storage batteries such as a home electricity storage system and a solar power generation system.

REFERENCE SIGNS LIST

11 Positive electrode collector
12 Layer containing a positive electrode active material
13 Layer containing a negative electrode active material
14 Negative electrode collector
15 Non-aqueous electrolyte
16 Porous separator

The invention claimed is:

1. A non-aqueous electrolyte comprising a non-aqueous electrolyte solvent, a supporting salt, and a sulfonate represented by the following general formula (1):

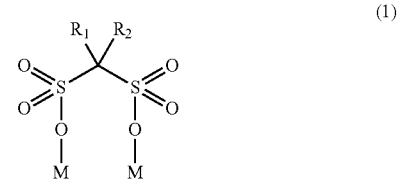

wherein $R_1$ and $R_2$ each independently represent a hydrogen atom, a halogen atom, or C1 to C5 alkyl group, and M represents lithium,
wherein the concentration of the sulfonate is 0.001 wt % or more and less than 0.2 wt % based on the total mass of the non-aqueous electrolyte.

2. The non-aqueous electrolyte according to claim 1, further comprising at least one compound selected from the group consisting of cyclic disulfonic acid ester compounds and chain disulfonic acid ester compounds.

3. The non-aqueous electrolyte according to claim 1, wherein the non-aqueous electrolyte solvent comprises at least one organic solvent selected from the group consisting of cyclic carbonate compounds, chain carbonate compounds, chain carboxylic acid ester compounds, cyclic carboxylic acid ester compounds, cyclic ether compounds, chain ether compounds, phosphoric acid ester compounds, and fluorinated derivatives thereof.

4. The non-aqueous electrolyte according to claim 1, wherein the non-aqueous electrolyte solvent comprises 10 to 60% of the cyclic carbonate compound based on 100% (volume ratio) of the non-aqueous electrolyte solvent.

5. A non-aqueous electrolyte secondary battery comprising the non-aqueous electrolyte according to claim 1, a negative electrode, and a positive electrode.

6. The non-aqueous electrolyte secondary battery according to claim 5, wherein the positive electrode comprises at least a lithium-containing complex oxide as a positive electrode active material.

7. The non-aqueous electrolyte secondary battery according to claim 5, wherein the negative electrode comprises, as a negative electrode active material, at least one selected from the group consisting of materials at least capable of absorbing and desorbing lithium, a lithium metal, metal materials capable of forming alloy with lithium, and metal oxide materials.

8. The non-aqueous electrolyte secondary battery according to claim 5, wherein the negative electrode comprises carbon as a negative electrode active material.

9. A method for producing a non-aqueous electrolyte secondary battery having a non-aqueous electrolyte, the method comprising forming the non-aqueous electrolyte secondary battery by using a non-aqueous electrolyte comprising a non-aqueous electrolyte solvent; a supporting salt; at least one compound selected from the group consisting of cyclic disulfonic acid ester compounds and chain disulfonic acid ester compounds; and a sulfonate represented by the following general formula (1):

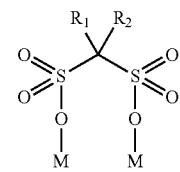

(1)

wherein $R_1$ and $R_2$ each independently represent a hydrogen atom, a halogen atom, or C1 to C5 alkyl group, and M represents lithium, wherein the sulfonate represented by the general formula (1) is contained in an amount of 0.001 wt % or more and less than 0.2 wt % based on the total mass of the non-aqueous electrolyte.

* * * * *